United States Patent

Kiuchi et al.

[11] Patent Number: 5,575,189
[45] Date of Patent: Nov. 19, 1996

[54] ROLLER HAVING GROOVES FOR WIRE SAW

[75] Inventors: Etsuo Kiuchi, Gunma-gun; Kazuo Hayakawa, Takasaki; Kouhei Toyama, Nishi-shirakawa-gun, all of Japan

[73] Assignee: Shin-Etsu Handotai Co., Ltd., Tokyo, Japan

[21] Appl. No.: 452,835

[22] Filed: May 30, 1995

[30] Foreign Application Priority Data

Jun. 28, 1994 [JP] Japan .................................. 6-168794

[51] Int. Cl.⁶ ........................... B26D 1/547; B28D 1/08
[52] U.S. Cl. ........................ 83/651.1; 83/171; 125/16.02
[58] Field of Search ........................ 83/171, 170, 651.1; 451/449, 488; 125/16.02, 16.01, 21

[56] References Cited

U.S. PATENT DOCUMENTS

| | | |
|---|---|---|
| 2,826,880 | 3/1958 | Wisnieski et al. ............. 451/449 |
| 4,134,384 | 1/1979 | Schafft et al. .................. 125/21 |
| 5,377,568 | 1/1995 | Hauser . | |

FOREIGN PATENT DOCUMENTS

| | | |
|---|---|---|
| 0549893 | 7/1993 | European Pat. Off. . |
| 0552663 | 7/1993 | European Pat. Off. . |
| 251063 | 10/1987 | Japan . |
| 62-251063 | 10/1987 | Japan . |
| 5-154831 | 6/1993 | Japan . |

OTHER PUBLICATIONS

Patent Abstracts of Japan, vol. 17, No. 552 (M–1491), Oct. 5, 1993.
Patent Abstracts of Japan, vol. 12, No. 126 (M–687), Apr. 19, 1988.

*Primary Examiner*—Kenneth E. Peterson
*Assistant Examiner*—Sean A. Pryor
*Attorney, Agent, or Firm*—Oliff & Berridge

[57] ABSTRACT

A roller with grooves for a wire saw around which a cutting wire is wrapped. The roller comprises a core member having an inside divided into two areas which have a boundary at the center in the longitudinal direction of the core member, wherein each of the areas has a passage for circulation of a coolant and the inlet and the outlet of each passage are provided in the vicinity of the outer end of one area side in which the passage belongs.

19 Claims, 7 Drawing Sheets

ROLLER HAVING GROOVES FOR WIRE SAW

BACKGROUND OF THE INVENTION

1. Field of the Invention

The present invention relates to a wire saw machine for sawing an article to be processed, hereinafter referred to a work simply, e.g., a brittle material such as a semiconductor single crystal, a magnetic material, quartz, ceramic or the like, into a plurality of slices, and in particular, to an improved structure of a roller having grooves for the wire saw machine in which a cutting wire is wrapped around a plurality of rollers.

2. Description of Related Art

Conventionally, in order to manufacture a plurality of slices of a brittle material such as semiconductor wafers by cutting a work, a wire saw machine has been used. In the wire saw machine, semiconductor wafers or the like are manufactured by a lapping function to cut the work, that is, by pushing the work against a plurality parallel lines of cutting wire with a constant pitch, and by supplying an abrasive slurry containing abrasive grains into between the work and the lines of wire, while complex action of the cutting wire which comprises back and forth action and feeding action, is taken.

Although such a kind of wire saw machine has the disadvantage of a smaller speed for cutting a work than that of an inner diameter saw slicing machine, the wire saw machine has the advantage of simultaneous cutting of many wafers. For example, a cutting for a silicon single crystal having a diameter of 125 mm according to the wire saw machine requires about 6 hours, on the other hand, it enables obtaining about 200 cut wafers at a time.

In use of the wire saw machine, heat is generated by the friction between the lines of the cutting wire and the work and by the friction in bearing portions of the rollers with grooves thereof around which the cutting wire is wrapped, during cutting. Such generated heat changes the temperature of each roller with grooves during cutting to change the pitches of the grooves which are curved on the peripheral surface of each roller. Change of the pitches of the grooves on the periphery of the roller leads to change of the pitches of the lines of the cutting wire, during cutting. Consequently, undulations may be formed on the cut surfaces of the wafers or the like.

Conventionally, in order to solve the above-described problem, a rolling apparatus was developed, as shown in Japanese Patent Application Laid-Open Publication No. Tokukai-Sho 62-251063. The roller with grooves used in the rolling apparatus shown in the Publication has a cavity formed in a core member thereof, which constitutes a part of an oil passage. In the rolling apparatus, a cooling oil is introduced into the cavity through one end of the apparatus and is discharged from the other end.

However, the rolling apparatus in which a cooling oil is introduced into the cavity through one end of the apparatus and is discharged from the other end, raises the following problems.

Because the cooling oil which was supplied from an inlet for supplying oil into the cavity endothermically moves toward an outlet for discharging oil which is provided at the other end of the apparatus, the temperature of the oil becomes higher as the oil gets nearer to the outlet, so that the endothermic coefficient or the endothermic amount of the cooling oil becomes smaller. The difference between the endothermic amounts of the cooling oil at both ends generates a temperature gradient along the longitudinal direction of the rolling apparatus with grooves, and thereby pitches of the grooves for accepting the lines of wire, one by one, which are formed on the peripheral surface of a sleeve of the apparatus, are changed. Such tendency becomes larger, as the diameter or the length of the work such as a silicon single crystal ingot is larger. Conventional wire saw machines were used for cutting works having a diameter of about 150 mm and a length of about 300 mm. However, recently, cutting of larger works, e.g., having a diameter of about 200 mm and a length of about 800 mm to 1000 mm, is required.

SUMMARY OF THE INVENTION

The present invention was developed in view of the above-described problems. An object of the present invention is to provide a roller with grooves having a structure which enables reduction of such temperature gradient along the longitudinal direction of the roller.

In accordance with one aspect of the present invention, the roller having grooves on the peripheral surface thereof for a wire saw machine, comprises; a core member having a pair of inside areas which are partitioned, wherein each of the inside areas has a passage for circulation of a coolant, and an inlet and an outlet of each passage are provided in the vicinity of the outer end of each inside area in which the passage belongs.

Preferably, the roller further comprises a cylindrical sleeve which is concentrically mounted on the periphery of the core member and has a plurality of grooves for accepting lines of cutting wire on the peripheral surface thereof. In the roller, the core member may further comprise two pairs of slip rings which are disposed to cover the two pairs of inlets and outlets of the passages. Preferably, the core member further comprises a pair of column-shaped or cylindrical passage members which are disposed in the pair of inside areas, respectively and each of which has the passage for circulation of a coolant, including a meandering pass extending on the peripheral surface thereof. The core member may further comprise a wall member for partitioning the pair of inside areas, which is sandwiched by the pair of passage members. Preferably, the wall member is provided in the core member at approximately the center thereof. Each passage for circulation of a coolant preferably comprises a first pass which extends linearly and an end of which is communicated with one of the inlet and the outlet, and a second pass which extends meandering on the peripheral surface of the passage member and an end of which is communicated with the other end of the first pass and the other end of which is communicated with the other of the inlet and the outlet. The second pass may have a development of approximately a rectangular wave-shape and may be formed over the peripheral surface of the passage member.

The second pass may be spirally formed over the peripheral surface of the passage member. The first pass may be a linear through hole formed inside the passage member. The core member may further comprise a rotary shaft therefor which penetrates the center of the roller; and each of the inside areas comprises a cavity formed around the rotary shaft and first and second passes formed in the rotary shaft, wherein the first pass is for introducing a coolant from the inlet into the cavity and the second pass is for discharging the coolant from the cavity to the outlet. The core member may further comprise rotary joints which are disposed to cover the two pairs of inlets and outlets of the passages.

In the roller of the present invention, after the coolant is supplied into the core member from both ends thereof to proceed toward the center of the core member, the direction of each flow of the coolant is changed to one toward each end at the vicinity of the center, and the coolant is discharged from each end. The coolant supplied from each end of the core member cools only each half of the roller with grooves. Therefore, the difference of the coolant between temperatures at each end of the roller and near the center thereof becomes small, in comparison with that of the conventional structure in which a coolant is supplied from one end of the core member and is discharged from the other end thereof. Consequently, according to the present invention, the endothermic ratio of the coolant at near the center of the roller is approximately equal to that at each end thereof, so that the roller is cooled uniformly in the longitudinal direction.

In accordance with another aspect of the present invention, the roller having grooves on the peripheral surface thereof for a wire saw machine, comprises: a core member which comprises a cylindrical body member, a central wall member for partitioning the inside of the body member into a pair of inside areas, and a pair of passage members which are provided in the pair of inside areas and have passages for circulation of a coolant, wherein an inlet and an outlet of each passage are provided in the vicinity of the outer end of each inside area in which the passage belongs; and a cylindrical sleeve which is concentrically mounted on the periphery of the core member and has grooves for accepting lines of the cutting wire, one by one, on the peripheral surface thereof.

Each passage for circulation of a coolant may comprise a first pass which extends linearly and an end of which is communicated with one of the inlet and the outlet, and a second pass which extends meandering over the peripheral surface of the passage member and an end of which is communicated with the other end of the first pass and the other end of which is communicated with the other of the inlet and the outlet. Each passage member may comprise a first passage member which has the first and second passes, and a second passage member having the inlet and the outlet which are communicated with the first or second pass of the first passage member, and is provided to put the first passage member between the second member and the central wall member.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

PREFERRED EMBODIMENT OF THE INVENTION

Figure 1:
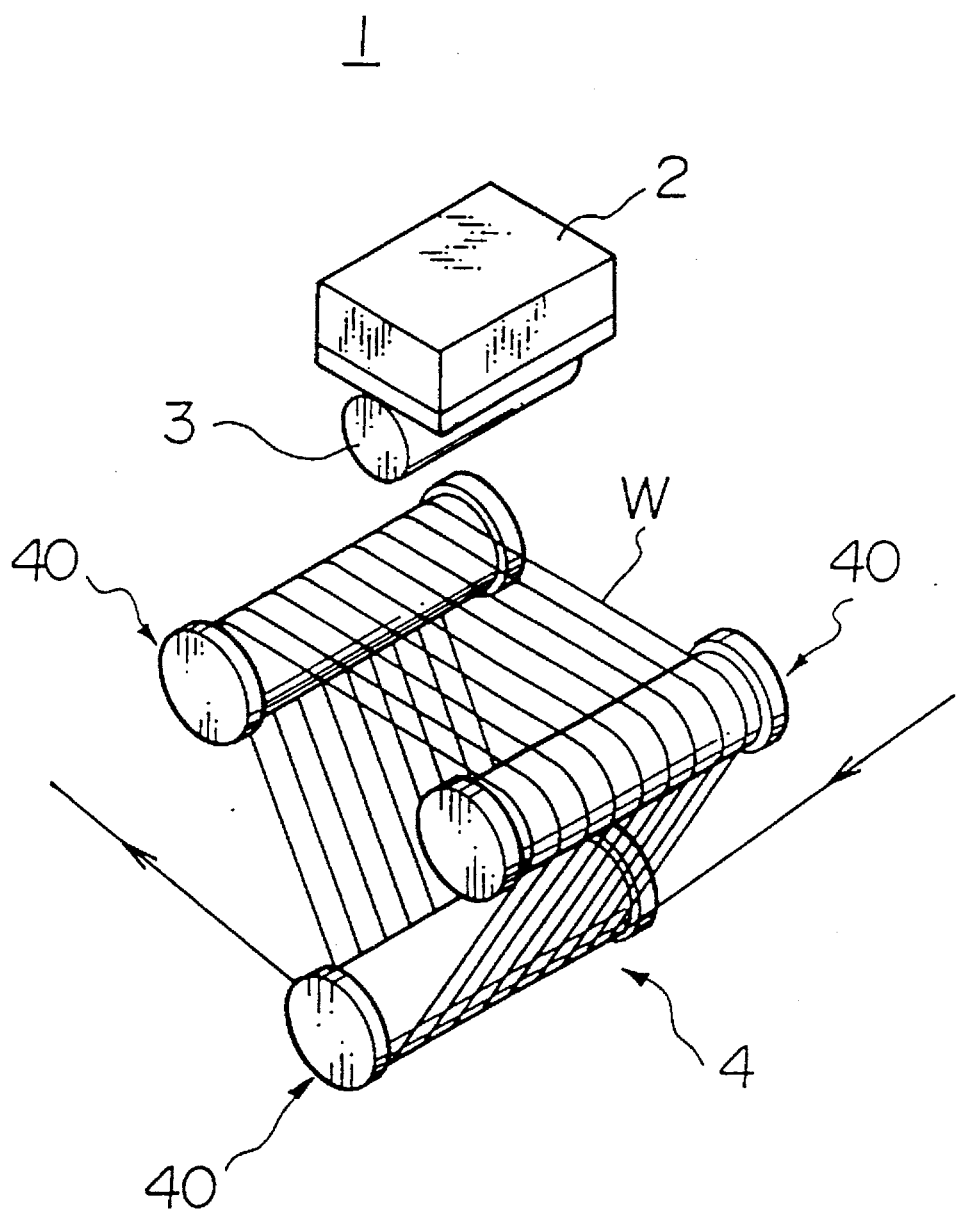
FIG. 1 is a perspective view showing the principal part of the wire saw machine for which rollers with grooves according to the present invention are applied.

FIG. 1 Shows the principal part of the wire saw machine having a plurality of rollers according to an embodiment of the present invention. The wire saw machine 1 comprises a workholder 2 to which a work 3 to be cut, e.g., a silicon single crystal ingot, is bonded, and a rolling apparatus 4 which comprises three rollers 40 having a plurality of grooves on peripheral surfaces thereof and is disposed under the workholder 2. Around these three rollers 40, a cutting wire W is wrapped a plurality of times with a constant pitch to form a plurality Of lines. Each groove formed on the peripheral surfaces of each roller 40 accepts one of the plurality of lines of cutting wire W. In the wire saw machine, wafers are manufactured by cutting the work 3, that is, by taking complex action of the cutting wire W, which comprises back and forth action and feeding action, while the work 3 bonded to the workholder 2 is pushed against the plurality of lines of cutting wire W.

Figure 2:
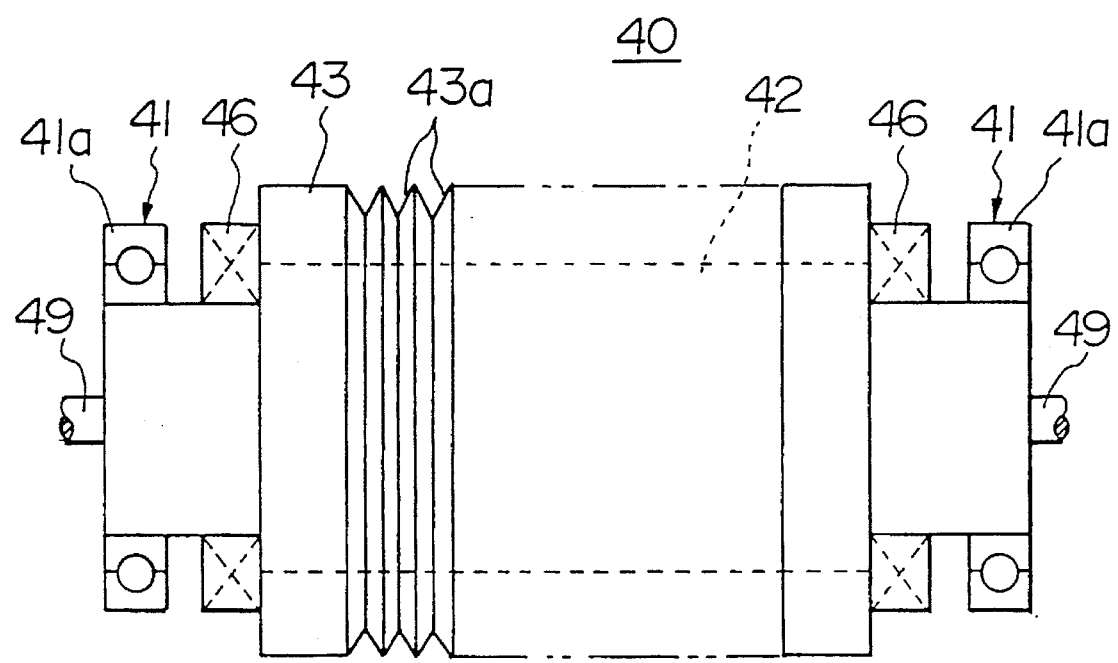
FIG. 2 is a view showing a structure of the principal part of the roller with grooves according to the first and second embodiments of the present invention.

Both ends of each roller 40 are supported by a pair of bearing devices 41 and 41 so that each roller 40 can rotate on a rotary shaft 49, as shown in FIG. 2.

Each roller 40 comprises a metal cylindrical core member 42 and a plastic cylindrical sleeve 43 which is mounted on the periphery of the core member 42 concentrically. On the periphery of both ends of the core member 42, slip rings 46 and 46 are concentrically provided.

Figure 3:
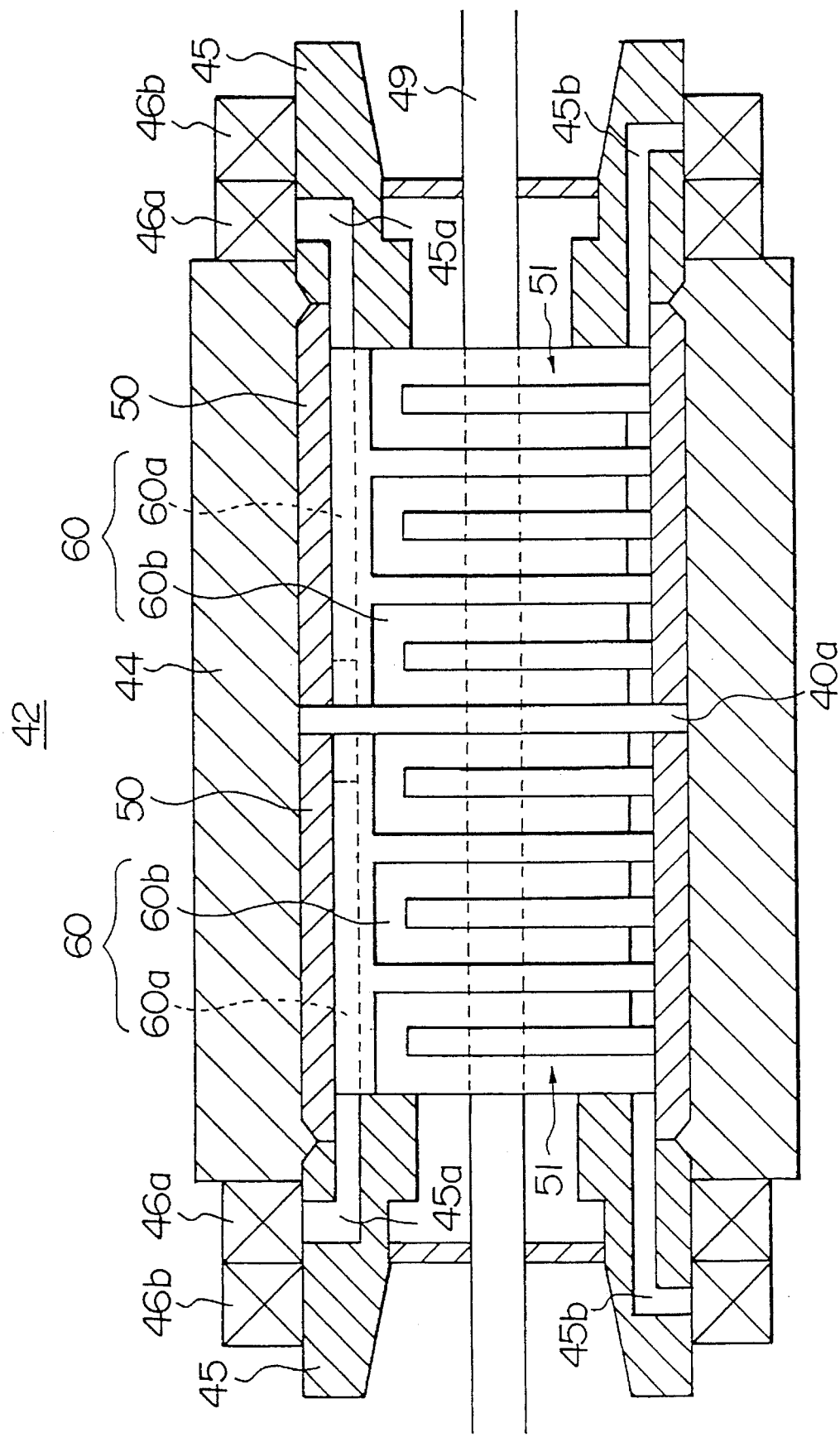
FIG. 3 is a view showing a structure of the core member in the roller with grooves according to the first embodiment of the present invention.

The core member 42 comprises a cylindrical body member 44 having a large diameter, a central wall member 40a for partitioning to divide the inside of the body member 44 into a pair of inside areas, a pair of ring members 50 and 50 for laterally sandwiching to position the central wall member 40a at the center of the inside of the body member 44 in the longitudinal direction, which are provided in the pair of areas, respectively and fitted in the body member 44, a pair of column-shaped passage members (first passage members) 51 and 51 for circulating a coolant therein, each of which is tightly fitted into each ring member 50, a pair of shaft members 45 (second passage members) which are attached to both ends of the body member 44, a rotary shaft 49 for rotating the roller, which penetrates through the central wall member 40a and both passage members 51 and 51, and two pairs of slip rings 46a and 46a, and 46b and 46b, as shown in FIG. 3.

Figure 4:
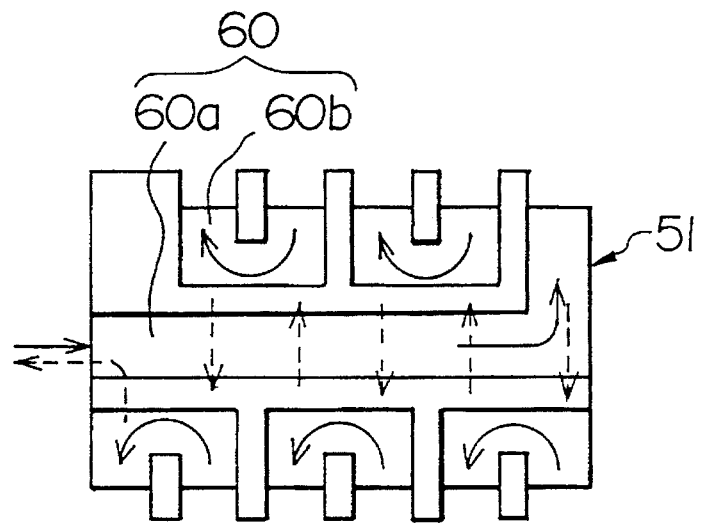
FIG. 4 is a plan view of the passage member in the first embodiment of the present invention.
Figure 5:
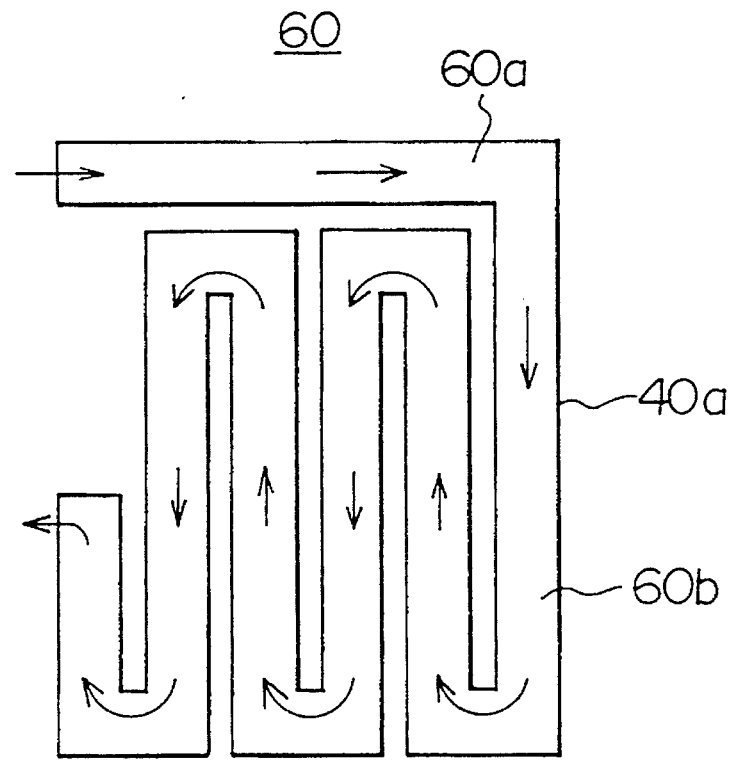
FIG. 5 is a development of a groove of the passage member in the first embodiment of the present invention.

Each first passage member 51 has a passage 60 for circulating a coolant, which is provided on the periphery thereof. The passage 60 comprises a first pass 60a extending linearly in the longitudinal direction, as shown in a plan view of FIG. 4, and a second pass 60b which is communicated with the first pass 60a at an end thereof adjacent to the central wall member 40a and has a development of a rectangular wave-shape, as shown in FIG. 5. The second pass 60b is communicated with the first pass 60a at only the end thereof which is adjacent to the central wall member 40a and extends to the other end of the passage member in a zig zag line. The developed rectangular wave-shape of the pass 60*b* is for preventing the second pass 60*b* from interfering with the first pass 60*a* on the way. These first and second passes 60*a* and 60*b* constitute a passage for circulating a coolant on the periphery of each first passage member 51.

In each of the second passage members 45 and 45, i.e., the shaft members, of both ends of the core member 42, an inlet 45*a* for introducing a coolant into the roller and an outlet 45*b* for discharging the coolant out of the roller are provided to Communicate with corresponding ends of the passage 60. A slip ring 46*a* is tightly fitted on the periphery of each second passage member 45 to cover the provided inlet 45*a*, and a slip ring 46*b* is tightly fitted on the periphery of each second passage member 45 to cover the provided outlet 45*b*.

The sleeve 43 is tightly fitted on the periphery of the body member 44 of the core member 42, as shown in FIG. 2. On the periphery of the sleeve 43, a large number of wire guide grooves 43*a* each having a V-shaped section are formed with a predetermined pitch in a longitudinal direction, so that a cutting wire W can be wrapped around the sleeve 43 through the guide grooves 43*a* thereon each of which accepts a single line of the wire W.

Each roller shaft bearing device 41 includes a bearing 41*a* for supporting the core member 42 to be rotatable on each shaft member 45, as shown in FIG. 2.

Next, the function of the roller 40 will be explained.

In the roller 40 having grooves for the wire saw machine, the coolant is supplied into the passage 60 through the inlet 45*a* for coolant which is formed on the periphery of each second passage member 45. The supplied coolant proceeds in the linear first pass 60*a* which is provided on the periphery of the first passage member 51 to reach the central wall member 40*a*. Thereafter, the coolant proceeds in the meandering second pass 60*b* which is provided on the periphery of the passage member 51, to reach the outlet 45*b* for coolant which is formed on the periphery of each second passage member 45, and is discharged through the outlet 45*b*. During flowing of the coolant, the body member 44 and the sleeve 43 is cooled by the coolant.

According to the roller 40 having such a construction, because the coolant which is supplied into the passage 60 from each inlet 45*a* provided at each end of the core member 42, cools half and half of the roller 40 separately, degree of temperature rise of the coolant is small in comparison with the case of a conventional roller. Therefore, the temperature difference of the coolant between at each end of the roller 40 and at near the center thereof is small. Consequently, the endothermic ratio of the coolant is approximately uniform in the longitudinal direction of the roller 40, so that the roller 40 is uniformly cooled in the longitudinal direction.

Figure 6:
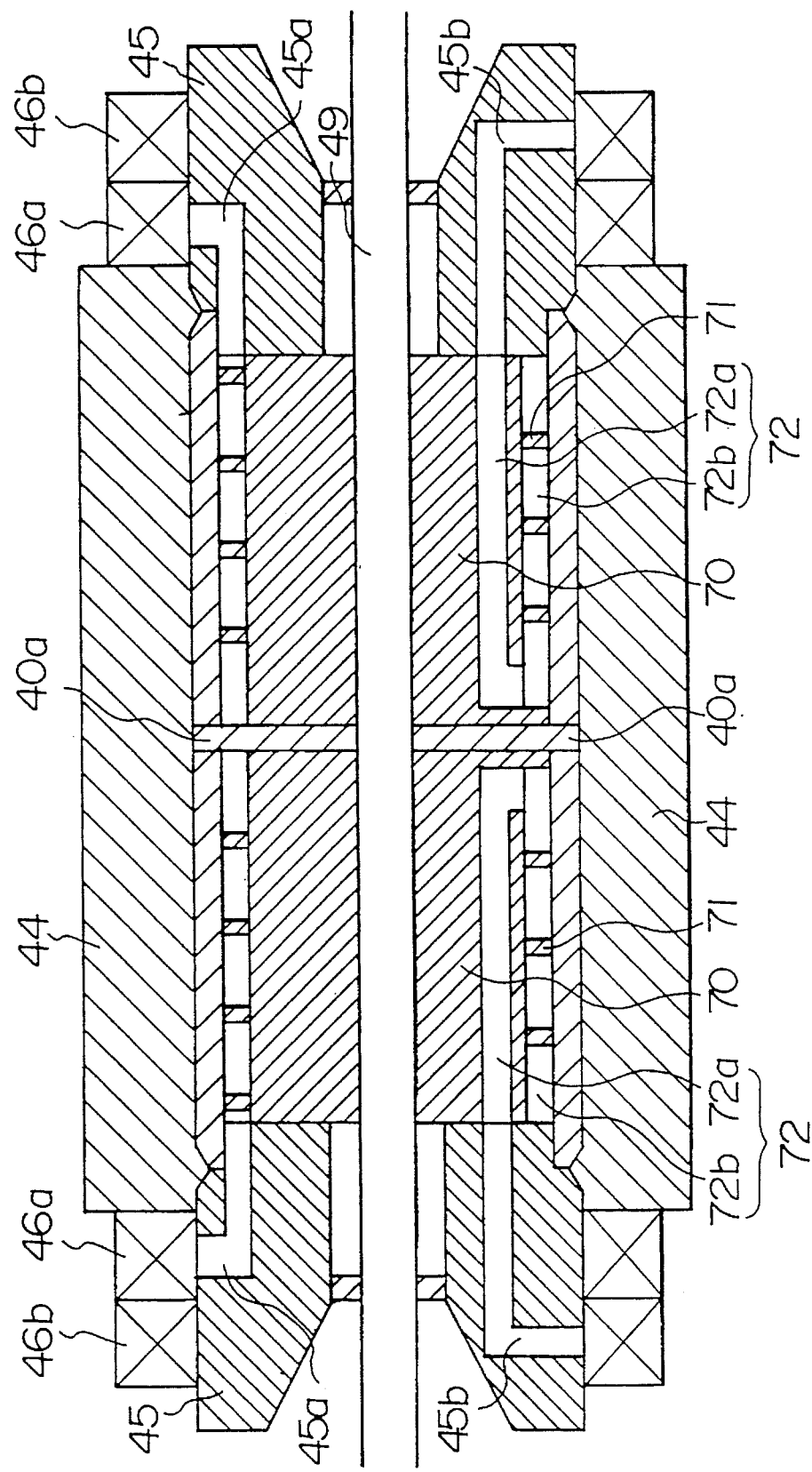
FIG. 6 is a view showing a structure of the principal part of the roller with grooves according to the second embodiment of the present invention.
Figure 7:
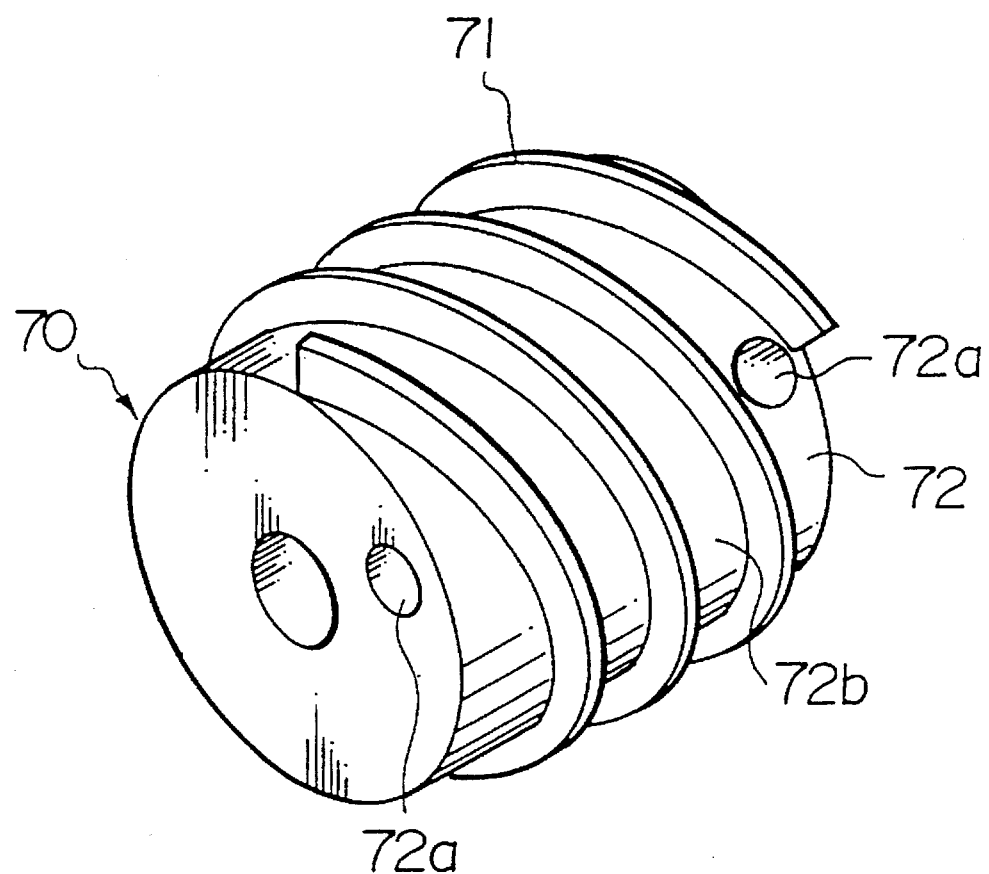
FIG. 7 is a perspective view of the passage member of the roller of the second embodiment of the present invention.

FIG. 6 shows the principal part of the roller, that is, a core member 62, according to the second embodiment of the present invention. In this core member 62, a pair of column-shaped first passage members 70 and 70 having another structure are used instead of the first passage members 51 and 51 in the first embodiment. In the second embodiment, the coolant supplied from an inlet 45*a* is led to reach a central wall member 40*a* through a spiral passage as shown in FIG. 7 which is provided over the periphery of each first passage member 70, and thereafter is led to reach an outlet 45*b* through the inside of each first passage member 70. Since other structures in this embodiment are approximately the same as those of the first embodiment, a detailed explanation for such structures is omitted. In FIG. 6 showing this embodiment, the same numbers are attached to structural members, elements or the like corresponding to those of the first embodiment.

Next, the first passage member 70 will be explained as follows. Each first passage member 70 has a passage 72 for circulating a coolant, which comprises a linear first pass 72*a* and a spiral second pass 72*b*, as shown in FIG. 7. On the peripheral surface of the first passage member 70, a coolant guide 71 is spirally provided to form the spiral second pass 72*b*, as shown in FIG. 7 which is a perspective view of the passage member 70 in the left side in FIG. 6. In the first passage member 70, a through hole 72*a* for circulating coolant, which constitutes a linear first pass and is communicated with the spiral second pass 72*b* partitioned by the coolant guide 71, at an end thereof adjacent to the wall member 40*a*, i.e., at the inner end of the first passage member 70, is formed. The first pass 72*a* extends to the outer end of the first passage member 70 and is communicated with an outlet 45*b* for coolant.

The roller according to this embodiment provides approximately the same effects as that of the first embodiment.

Figure 8:
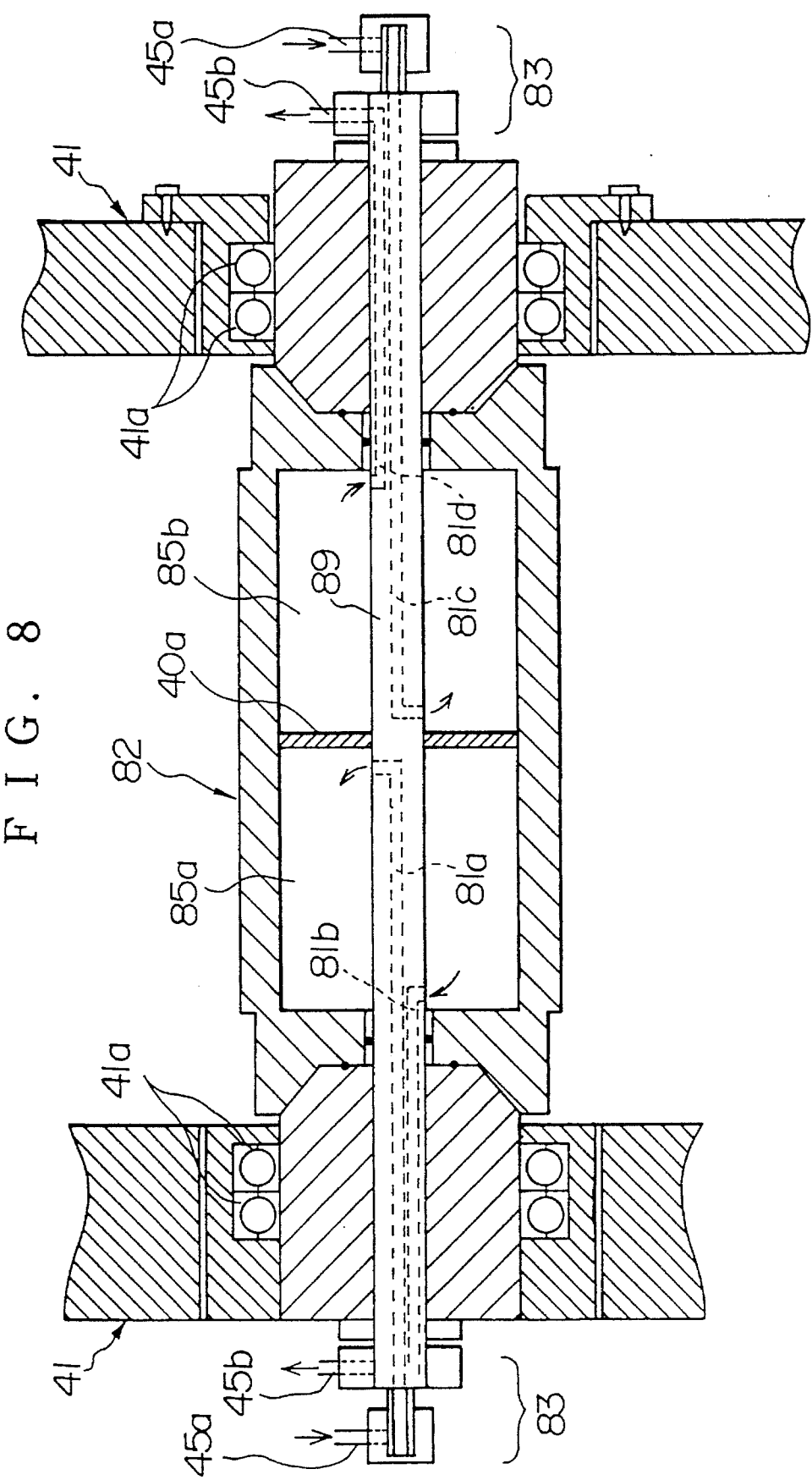
FIG. 8 is a partially sectional view showing a structure of the principal part of the roller with grooves according to the third embodiment of the present invention.

FIG. 8 shows the core member 82 of the roller according to the third embodiment of the present invention. The roller according to the embodiment do not have a first passage member 51 or 70 which is provided in the first and the second embodiments. Instead of providing such a member, the roller according to the third embodiment has a pair of left and right cavities 85*a* and 85*b* inside the core member 82, which are provided around a rotary shaft 89 and are laterally partitioned by a wall member 40*a*. Inside the left half of the rotary shaft 89, a first pass 81*a* and a second pass 81*b*, for circulating the coolant, which comprise a pair of through holes and are communicated with the left cavity 85*a*, are formed. The passage for circulating the coolant in the left half of the core member 82 comprises the first pass 81*a*, the left cavity 85*a*, and the second pass 81*b*. Similarly, inside the right half of the rotary shaft 89, a first pass 81*c* and a second pass 81*d*, for circulating the coolant, which comprise a pair of through holes and are communicated with the right cavity 85*b*, are formed. The passage for circulating the coolant in the right half of the core member 82 comprises the first pass 81*c*, the right cavity 85*b*, and the second pass 81*d*. Rotary joints 83 and 83 are attached to left and right ends of the rotary shaft 89. In the left rotary joint 83, an inlet 45*a* for coolant which is communicated with the first pass 81*a* and an outlet 45*b* for coolant which is communicated with the second pass 81*b*, are provided. On the other hand, in the right rotary joint 83, an inlet 45*a* for coolant which is communicated with the first pass 81*c* and an outlet 45*b* for coolant which is communicated with the second pass 81*d*, are provided. Since other structures in this embodiment are approximately the same as those of the first embodiment, a detailed explanation for such structures is omitted. In FIG. 8 showing this embodiment, the same numbers are attached to structural members, elements or the like corresponding to those of the first embodiment.

In the roller according to the third embodiment, the coolant supplied from each end of the rotary shaft 89 is introduced into the cavity 85*a* or 85*b* through the through hole 81*a* or 81*c*, and cools approximately the left or right half of the core member 82 which is contact with each of the cavities partitioned by the wall member 40*a*. Thereafter, the coolant is discharged through the through hole 81*b* or 81*d*.

The roller with grooves according to this embodiment provides approximately the same effects as that of the First Embodiment.

Although the present invention has been described in its preferred form with a certain degree of particularity, it should also be understood that the present invention is not limited to the preferred embodiment and that various changes and modifications may be made to the invention without departing from the spirit and scope thereof.

For example, a plurality of grooves for accepting lines of the cutting wire are formed on the peripheral surface of the sleeve 43 in the above-described embodiments. However, these grooves can be also formed on the peripheral surface of the core member 42, 62, or 82, without preparing a sleeve.

In the first and second embodiments, the passage 60$a$, 60$b$, or 72$b$ for circulating a coolant is formed on the first passage member 51 or 70 by a groove, however, the passage can be also formed by a through hole in the passage member.

As described above, the roller having grooves for a wire saw machine around which a cutting wire is wrapped, according to the present invention, comprises a core member having an inside divided into two areas which have a boundary at the center in the longitudinal direction of the core member, wherein each of the areas has a passage for circulation of a coolant and the inlet and the outlet of each passage are provided in the vicinity of the outer end of one area side in which the passage belongs. Therefore, the endothermic ratio of the coolant is approximately uniform in the longitudinal direction of the roller, so that the roller is cooled uniformly in the longitudinal direction.

What is claimed is:

1. A roller having grooves on the peripheral surface thereof for a wire saw machine, comprising;
   a core member which is partitioned into a pair of inside areas wherein, one of said inside areas is generally positioned at a first end of said core member, and the other of said inside areas is generally positioned at a second end of said core member opposed to said first end, wherein each of the inside areas has a passage for circulation of a coolant, and an inlet and an outlet of each passage are provided in the vicinity of an outer end of each inside area in which the passage belongs.

2. A roller as claimed in claim 1, further comprising a cylindrical sleeve which is concentrically mounted on the periphery of the core member and has a plurality of grooves for accepting lines of cutting wire on the peripheral surface thereof.

3. A roller as claimed in claim 1, wherein the core member further comprises two pairs of slip rings which are disposed to cover the two pairs of inlets and outlets of the passages.

4. A roller as claimed in claim 1, wherein the core member further comprises a pair of column-shaped passage members which are disposed in the pair of inside areas, respectively and each of which has the passage for circulation of a coolant, including a spiral pass extending on the peripheral surface thereof.

5. A roller as claimed in claim 4, wherein the core member further comprises a wall member for partitioning the pair of inside areas, which is sandwiched by the pair of passage members.

6. A roller as claimed in claim 1, wherein the core member further comprises a pair of column-shaped passage members which are disposed in the pair of inside areas, respectively and each of which has the passage for circulation of a coolant, including a spiral pass extending on the peripheral surface thereof.

7. A roller as claimed in claim 5, wherein the wall member is provided in the core member at approximately the center thereof.

8. A roller as claimed in claim 4, wherein each passage for circulation of a coolant comprises a first pass which extends linearly and an end of which is communicated with one of the inlet and the outlet, and a second pass which extends spirally on the peripheral surface of the passage member and an end of which is communicated with the other end of the first pass and the other end of which is communicated with the other of the inlet and the outlet.

9. A roller as claimed in claim 4, wherein each passage for circulation of a coolant comprises a first pass which extends linearly and an end of which is communicated with one of the inlet and the outlet, and a second pass which extends meanderingly on the peripheral surface of the passage member and an end of which is communicated with the other end of the first pass and the other end of which is communicated with the other of the inlet and the outlet.

10. A roller as claimed in claim 8, wherein the second pass has an approximately rectangular wave-shape and is formed over the peripheral surface of the passage member.

11. A roller as claimed in claim 8, wherein the second pass is spirally formed over the peripheral surface of the passage member.

12. A roller as claimed in claim 11, wherein the first pass is a linear through hole formed inside the passage member.

13. A roller as claimed in claim 1, wherein the core member further comprises a pair of cylindrical passage members which are disposed in the pair of inside areas, respectively and each of which has the passage for circulation of a coolant, including a spiral pass extending on the peripheral surface thereof.

14. A roller as claimed in claim 1, wherein the core member further comprises a pair of cylindrical passage members which are disposed in the pair of inside areas, respectively and each of which has the passage for circulation of a coolant, including a meandering pass extending on the peripheral surface thereof.

15. A roller as claimed in claim 1, wherein the core member further comprises a rotary shaft therefor which penetrates the center of the roller; and each of the inside areas comprises a cavity formed around the rotary shaft and a first pass and a second pass formed in the rotary shaft, wherein the first pass is for introducing a coolant from the inlet into the cavity and the second pass is for discharging the coolant from the cavity to the outlet.

16. A roller as claimed in claim 15, wherein the core member further comprises rotary joints which are disposed to cover the two pairs of inlets and outlets of the passages.

17. A roller having grooves on the peripheral surface thereof for a wire saw machine, comprising:
   a core member which comprises a cylindrical body member, a central wall member for partitioning an inside of the body member into a pair of inside areas wherein, one of said inside areas is generally positioned at a first end of said core member, and the other of said inside areas is generally positioned at a second end of said core member opposed to said first end, and a pair of passage members which are provided in the pair of inside areas and have passages for circulation of a coolant, wherein an inlet and an outlet of each passage are provided in the vicinity of an outer end of each inside area in which the passage belongs; and
   a cylindrical sleeve which is concentrically mounted on the periphery of the core member and has grooves for accepting lines of the cutting wire, one by one, on the peripheral surface thereof.

18. A roller as claimed in claim 17, wherein each passage for circulation of a coolant comprises a first pass which extends linearly and an end of which is communicated with one of the inlet and the outlet, and a second pass which extends meandering over the peripheral surface of the passage member and an end of which is communicated with the other end of the first pass and the other end of which is communicated with the other of the inlet and the outlet.

19. A roller as claimed in claim 18, wherein each passage member comprises a first passage member which has the first and second passes, and a second passage member having the inlet and the outlet which are communicated with the first of second pass of the first passage member, and is provided to put the first passage member between the second member and the central wall member.

* * * * *